United States Patent
Qiao

(10) Patent No.: US 9,398,005 B1
(45) Date of Patent: Jul. 19, 2016

(54) MANAGING SEED PROVISIONING

(75) Inventor: Yong Qiao, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 943 days.

(21) Appl. No.: 13/246,406

(22) Filed: Sep. 27, 2011

(51) Int. Cl.
*H04L 29/00* (2006.01)
*H04L 29/06* (2006.01)
*H04L 9/32* (2006.01)

(52) U.S. Cl.
CPC .......... *H04L 63/0838* (2013.01); *H04L 9/3226* (2013.01); *H04L 9/3228* (2013.01); *H04L 9/3234* (2013.01); *H04L 9/3247* (2013.01); *H04L 63/0846* (2013.01); *H04L 63/0853* (2013.01)

(58) Field of Classification Search
CPC ............ H04L 63/0838; H04L 63/0846; H04L 63/0853; H04L 9/3228; H04L 9/3226; H04L 9/3234; H04L 9/3247
USPC ........ 713/172–174, 176–180, 185; 726/9, 20, 726/27–30; 380/30
See application file for complete search history.

(56) References Cited

U.S. PATENT DOCUMENTS

| | | | | |
|---|---|---|---|---|
| 6,148,404 | A * | 11/2000 | Yatsukawa | 726/2 |
| 7,269,277 | B2 * | 9/2007 | Davida et al. | 382/117 |
| 8,312,519 | B1 * | 11/2012 | Bailey | H04L 9/003 380/255 |
| 8,590,030 | B1 * | 11/2013 | Pei | H04L 63/0838 726/9 |
| 2003/0115468 | A1 * | 6/2003 | Aull et al. | 713/175 |
| 2007/0011724 | A1 * | 1/2007 | Gonzalez | G06F 21/31 726/4 |
| 2007/0174614 | A1 * | 7/2007 | Duane et al. | 713/168 |
| 2009/0006858 | A1 * | 1/2009 | Duane | G06F 21/34 713/185 |
| 2010/0205448 | A1 * | 8/2010 | Tarhan | G06F 21/33 713/185 |
| 2011/0138185 | A1 * | 6/2011 | Ju | G06F 21/10 713/171 |
| 2011/0173684 | A1 * | 7/2011 | Hurry | G06F 21/33 726/6 |

\* cited by examiner

*Primary Examiner* — Michael Pyzocha
(74) *Attorney, Agent, or Firm* — John T. Hurley; Jason A. Reyes; Krishnendu Gupta

(57) ABSTRACT

A method is used in managing seed provisioning. An authentication device having a device value is provisioned with a seed value. The seed value and device value are provided. Based on the seed value and the device value, the method prepares to authenticate the authentication device.

20 Claims, 3 Drawing Sheets

MANAGING SEED PROVISIONING

RELATED APPLICATIONS

This application is related to co-pending U.S. patent application Ser. No. 12/895,130 entitled "AGILE OTP GENERATION" filed Sep. 30, 2010, co-pending U.S. patent application Ser. No. 12/827,045 entitled "DEVICE BOUND OTP GENERATION" filed Jun. 30, 2010, co-pending U.S. patent application Ser. No. 11/824,434 entitled "SECURE SEED PROVISIONING" filed Jun. 29, 2007, the contents of which patent applications are hereby incorporated herein by reference in their entirety.

BACKGROUND OF THE INVENTION

Computer networks, and in particular Wide Area Networks (WANs) such as the Internet, provide opportunities for the misuse and abuse of communications traveling thereover. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a seed is required in order to perform certain cryptographic operations such as encryption, decryption, authentication, etc. The seed may comprise, by way of example, a symmetric key or other secret shared by two or more entities.

One such application is in authentication tokens, such as the RSA SecurID® authentication token commercially available from RSA, The Security Division of EMC, of Bedford, Mass., U.S.A ("RSA Security"). The RSA SecurID® authentication token is used to provide two-factor authentication. Authorized users are issued individually-registered tokens that generate single-use token codes, which change based on a time code algorithm. For example, a different token code may be generated every 60 seconds. In a given two-factor authentication session, the user is required to enter a personal identification number (PIN) plus the current token code from his or her authentication token. This information is supplied to an authentication entity. The authentication entity may be a server or other processing device equipped with RSA Authentication Manager software, available from RSA Security. The PIN and current token code may be transmitted to the authentication entity via an encryption agent equipped with RSA Authentication Agent software, also available from RSA Security. If the PIN and current token code are determined to be valid, the user is granted access appropriate to his or her authorization level. Thus, the token codes are like temporary passwords that cannot be guessed by an attacker, with other than a negligible probability.

A given RSA SecurID® token typically contains one or more seeds that are utilized in computing the token outputs. The authentication entity performing the verification of the token outputs requires access to one or more seeds associated with the token in question. Typically, such authentication entities have access to the same seed or set of seeds that the token uses to generate its output.

SUMMARY OF THE INVENTION

A method is used in managing seed provisioning. An authentication device having a device value is provisioned with a seed value. The seed value and device value are provided. Based on the seed value and the device value, the method prepares to authenticate the authentication device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
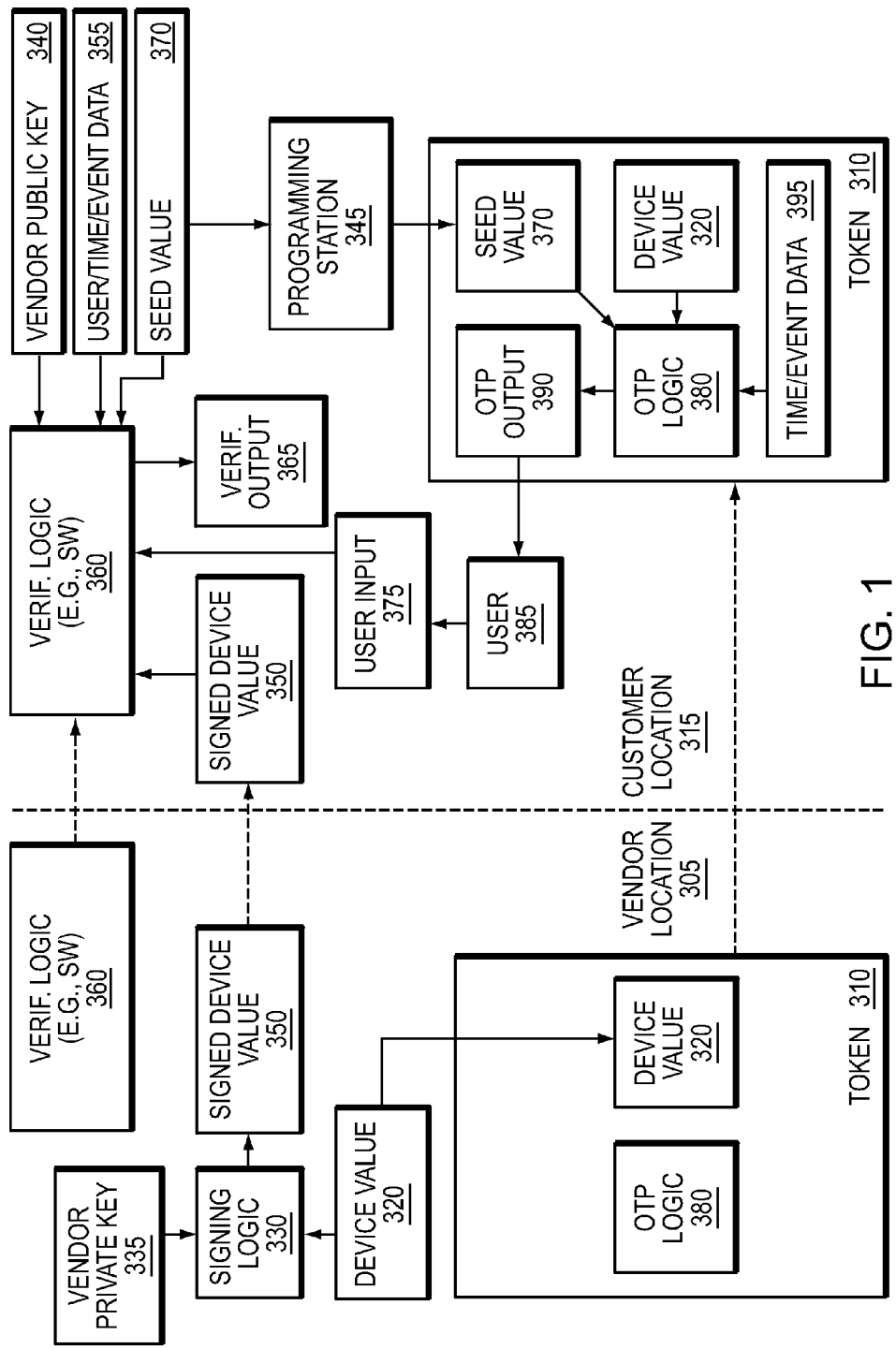
FIG. 1 is a block diagram illustrating an example embodiment that may utilize the techniques described herein.

Described below is a technique for use in managing seed provisioning, which technique may be used to help provide, among other things, a method for programming seeds into one-time-password (OTP) devices by customers. At least some implementations in accordance with the technique provide capabilities for customers to program a random seed into an OTP hardware device, while maintaining capabilities for the device vendor to issue a digitally signed token record for the authentication server and bind that token record to the specific OTP device.

Goals of at least some implementations based on the technique may include:

1. Allowing a customer to program a random seed into an OTP token provided by an OTP device vendor. The random seed, which the OTP device vendor does not have access to, is used by OTP logic in the token to generate OTP output such as OTP values.

2. Allowing the OTP device vendor to issue a signed token record (which is digitally signed by the vendor) to the customer for each OTP token. The signed token record entitles the use of the OTP token with a authentication server, through a unique binding between the token record and the OTP token.

One or more implementations based on the technique may operate as follows:

1. An OTP token uses a device-specific value (DV) and a seed value (SV), along with other data, as inputs to OTP logic to generate OTP output (e.g., values) based on at least one process (which may include use of one or more methods, formulas, or algorithms). The process is set up so that knowledge of DV does not make it any easier to guess SV or future OTP output.

2. The OTP device vendor has a unique DV programmed into each OTP token during manufacturing.

3. The OTP device vendor creates a digitally signed token record (digitally signed by the vendor) that includes the DV and other configuration data.

4. The customer programs a unique SV into each OTP token after receiving the token from the vendor, via a programming interface, including but not limited to an electrical, RF, optical, or mechanical interface.

5. The customer provides both the signed token record and the SV to the authentication server, to allow the server to verify the OTP output generated by the OTP token.

Depending on the implementation, the SV can be appended to the signed token record (but not as part of the signed token record), or can be provided to the server as a separate file with necessary information to be linked to the token record. As another option, the signed token record and the SV can be further combined to create a single digitally-signed record for the authentication server.

At least some implementations in accordance with the current technique as described herein may provide one or more of the following advantages:

1. The security of OTP authentication remains strong even if the device-specific value (DV) becomes known to the public.

2. Requiring the signed token record prevents the use of unauthorized tokens or devices with the authentication server, and allows the device vendor to control licensing terms, device life time, and device configuration without the device vendor having knowledge of the seed value SV.

3. There is no need for the device vendor to allow customers to create digitally signed token records for the authentication server.

FIG. 1 illustrates an example implementation based on the technique.

At a token vendor location 305, a token 310 has OTP logic 380 and is programmed with a DV 320. Each DV 320 may be or include, for example, a different, random 128 bit number.

Location 305 also has signing logic 330 that uses a vendor private key 335 to derive a signed device value 350 from DV 320. Value 350 is a digitally signed version of DV 320 wherein key 335 is used to digitally sign DV 320.

Value 350 is associated with token 310, e.g., by associating value 350 with a serial number (not shown) of token 310. In at least some implementations, the serial number may be etched or labeled or otherwise provided on the outside of the token.

It should be noted that, although the value 350 is shown as a signed device value, alternative example embodiments may also refer to the value 350 more generally as a signed token record. In this instance, the signed token record will include at least the DV, and may also include other device information (e.g., serial number) and configuration data. In another implementation, the DV can be the same as the serial number although it may be less desirable as the serial number is usually visible.

Vendor location 305 also has verification logic 360 which may be, include, or be included in authentication software such as authentication server software or an authentication toolkit or engine.

Logic 360, value 350 (along with its association with token 310), and token 310 are transferred from location 305 to customer location 315. At this point logic 360 and token 310 need to be prepared as described below, and then may be used in production as described further below.

At location 315, token 310 is associated with a user 385, e.g., by associating the serial number of token 310 with a user ID (not shown) of user 385. This association is provided to and stored by logic 360. In at least some cases, a PIN is also associated with the user ID, which association is also provided to and stored by logic 360 (e.g., as at least a portion of data 355).

Programming station 345 is used to program an SV 370 into token 310. SV 370 is also provided to and stored by logic 360 as being associated with token 310 (e.g., again by reference to the serial number). Alternatively, value 350 and SV 370 may be combined into a single before being provided to logic 360, and may include, but not limited to, appending the SV 370 separately to the signed token record (i.e., not as part of the signed token record), or combining them into a single digitally-signed record.

Using vendor public key 340, logic 360 verifies that value 350 came from vendor 305, derives DV 320 from value 350, and stores DV 320 as being associated with token 310.

At this point, logic 360 and token 310 are ready to be used in production, as follows.

Based on time/event data 395, logic 380 executes a process (which may include use of one or more methods, formulas, or algorithms) to derive OTP output 390 (e.g., a random or pseudorandom number) from at least SV 370, DV 320, and time/event data 395. For example, OTP output may be, include, or be included in a 6 or 8 digit value displayed by token 310.

Output 390 is provided to user 385 who then provides user input 375 to logic 360. Depending on the implementation, user input 375 may include output 390 (e.g., as transcribed by user 385 from output 390) and a PIN associated with the user.

Logic 360 derives a verification output 365 from user input 375, DV 320 (derived from value 350 as described above), SV 370, and user/time/event data 355. The derivation includes executing the same process that was executed above by logic 380, using DV 320, SV 370, and user/time/event data 355, and comparing the result of the process with user input 375. For example, the process may derive a number "777777" from DV 320, SV 370, and time data from data 355, and may prepend a PIN "123456" from data 355, to produce result "123456777777". In the example, if user 385 also provided "123456777777" as user input 375, logic 360 causes output 365 to indicate verification success.

Figure 2:
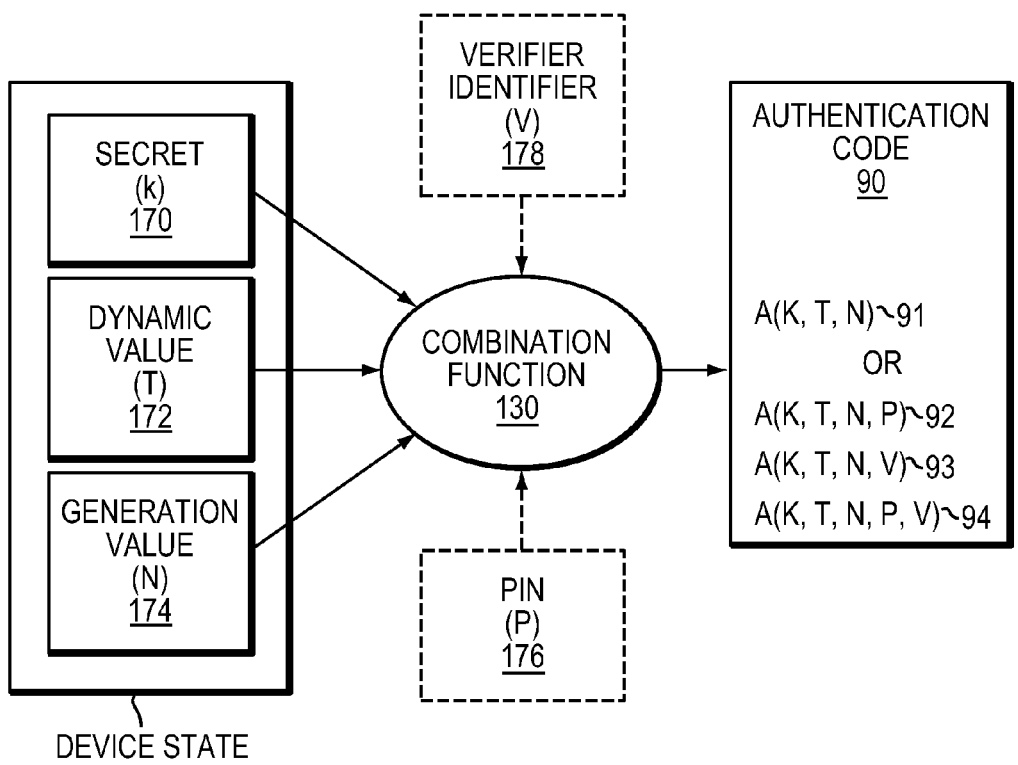
FIG. 2 is a block diagram illustrating an example embodiment of a combination function that may utilize the techniques described herein.

FIG. 2 illustrates an example of a combination function 130 that may be used in the process described above as being executed by logic 380 and logic 360. The combination function 130 generates an authentication code 90, e.g., output 390 using the state of a user authentication device (e.g., token 310). FIG. 2 illustrates examples of device state that may be used: secret (K) 170 (e.g., SV 370 or a secret derived from SV 370) stored by the user authentication device, which will be discussed in greater detail below, a dynamic, time-varying value (T) 172 generated by the user authentication device (e.g., as at least a portion of data 395), and a generation value (N) 174. Other examples of device state include the time and date of manufacture of the user authentication device, the amount of time since generation of the last authentication code, an encoding of the latitude and longitude of the location of manufacture of the user authentication device, an encoding of the location of the user authentication device at the time of generation of the user authentication device (using GPS or enhanced GPS, for example), or other similar quantities. The device state used by the combination function 130 may include one or more of the quantities described above. The combination function 130 can also optionally use user state (shown in phantom view in FIG. 2 as PIN (P) 176) or verifier states (shown in phantom view in FIG. 2 as verifier identifier (V) 178) to generate authentication code (A) 90 for a user (e.g., user 385). Other examples of user state include biometric information such as retinal scans and fingerprints, and identifying information such as social security number, birth date (possibly including time of birth) or employee codes. Verifier state 178 may include information identifying a verification computer or server (e.g., logic 360), such as IP address or processor serial number of the verification computer.

The combination function 130 can be implemented as instructions executed by a computer, for example, by firmware running on an embedded microprocessor. In other embodiments, the combination function 130 can be implemented in special-purpose hardware, such as an application specific integrated circuit, a field-programmable gate array, or other programmable logic device. In still other embodiments, the combination function 130 may be implemented as a software application program running on a general-purpose desktop, laptop, or handheld computing device.

FIG. 2 depicts generally a number of exemplary embodiments for generating the authentication code 90. It should be understood that the manner of combination and the input provided to the combination function 130 could vary from these examples. In one embodiment, an authentication code 91 may be constructed from a stored secret (K), a dynamic value (T), and a generation value (N). In this embodiment, the authentication code (A) 91 may be represented as a function of elements K, T, and N, which may be written as A (K, T, N). Also, the combination function 130, and the elements of the combination function 130 can be implemented in the user authentication device, a communications terminal, or some combination of the two.

The dynamic value (T) 172 may be a unit of information such as a numerical value (e.g. hexadecimal, decimal, or binary) that changes over time. In one embodiment, the dynamic value (T) 172 can be uniquely associated with a particular pre-determined time interval demarcated by a particular starting time and ending time. The time interval may not be required to be of any particular length nor is every time interval required to be the same length. The only requirement may be that the time interval schedule be roughly synchronized between the device and the verification computer. Exemplary methods that can be used to synchronize the device and the verification computer are described in U.S. Pat. No. 4,885,778, entitled "Method and Apparatus for Synchronizing Generation of Separate, Free Running, Time Dependent Equipment." A time interval could have the length of a minute, an hour, a month, a year, or any other convenient length of time. In one embodiment, the dynamic value (T) 172, identifying a particular time interval, could remain constant for all authentication codes generated within that particular time interval.

For example, in one embodiment, a constant time interval of a minute may be used, and the dynamic value may be the number of minutes since Midnight, Jan. 1, 1980. In another embodiment, a time interval of an hour may be used and the dynamic value could be the number of seconds since Noon, Dec. 15, 1999. The number of seconds can be determined for the first second of each time interval. In such an embodiment, the time from which counting begins can be a secret that is shared between the device and the verification computer. The interval period length(s) can also be secrets that are shared between the device and the verification computer.

In another embodiment, the length of each time interval may be an hour. Since, there are 24 hours in a day, each hour can be identified by a unique value such as the values 1 through 24; each of the 365 days of the year can be uniquely identified by the values 1 through 365; and each year can be identified by the number of the year, for example 2001. These three values, each identifying an hour, a day or a year, can be combined in such a manner to produce a value that uniquely identifies one and only one particular one-hour time interval. This one hour time interval can be indicated by a particular (hour-day-year) combination. For example, the value 100232001 would uniquely identify the period of time between 9:00 am and 10:00 am on the 23rd day (023) of the year 2001 (2001), that is Jan. 23, 2001. Similarly, the value 170322001 would uniquely identify the time period between 4:00 pm and 5:00 pm on the 32nd day (032) of the year 2001 (2001), that is Feb. 1, 2001. Other variations will be immediately understood by those of ordinary skill in the art.

In one embodiment, the dynamic value (T) 172 could be provided as the output of a time clock function, which may in turn be provided to a dynamic value function. The time clock function provides the current time to the dynamic value function. The dynamic value function could determine the appropriate dynamic value (T) 172 in response to the data provided by the clock function. In one such embodiment, implemented in a device having a clock and a processor, the dynamic value (T) 172 can be generated by a clock that may be a counter set to an initial value and incremented every second. This clock may count the number of seconds since the initially configured time. Every sixty seconds the clock may signal the dynamic value function, which reads the clock, increments the dynamic value (T) 172, and stores the incremented dynamic value as the dynamic value (T) 172 for that time interval.

In some embodiments, generation value (N) 174 may be a unit of information, such as a numerical value, that is uniquely associated with each authentication code generated during a particular time interval. For example, in one embodiment, the generation value may be changed such that no two authentication codes generated within the same time interval by the combination algorithm 130 are associated with the same generation value (N) 174. The generation value may be generated by a counter that is reset at the beginning of each time interval and may be incremented upon each generation of an authentication code. Also, the counter value itself may be used as the generation value. Alternatively, in another embodiment, the counter output can be provided as an input to a cryptographic or arithmetic function that determines the generation value.

In one embodiment, the secret (K) 170, the dynamic value (T) 172 and the generation value (N) 174 can be provided to the combination function 130 for combination as authentication code A (K, T, N) 91. The combination of the secret (K) 170, the dynamic value (T) 172 and the generation value (N) 174 can take place in any order and can use one or more various combination methods.

Still referring to FIG. 2, user data, such as a personal identification number (PIN) value (P) 176 can also be provided as input to the combination function 130. The user data, such as PIN, can be a unit of information such as an alphanumeric character string, or a strictly numerical value, uniquely associated with user 385. In one embodiment, the identity or value of the user data (PIN) can be a secret known only to the user 385 and the verification computer (i.e., not to the device). The user data (PIN value (P) 176) can be stored in a manner accessible to the verification computer that protects it from being compromised. The user data (PIN value (P) 176) could be, for example, the actual PIN, or biometric data that may be provided by the user, or the user data value (P) 176 can be the result of processing of the user data by one or more other functions. For example, in one embodiment, the user data (PIN (P)) 176 can be mapped to another value with a one-way function, such as a hash function, or a key derivation function before being provided as an input to the combination function 130.

In one embodiment, the combination function 130 may combine the user data value (PIN value (P) 176) with the secret (K) 170, the dynamic value (T) 172, and the generation value (N) 174 to generate an authentication code A (K, T, N, P) 92. The combination function 130 can combine these values (K, T, N, P) in any order to generate the authentication code 92. Certain combinations can take place on the user authentication device while others can take place on the communications terminal. Of course, it should be understood that the combination can include as variations other values or processing. As described, various embodiments of the device can receive input of the user data (PIN) 176 in various ways. These can include without limitation, user input of the PIN (P) 176 via a keypad, a keyboard, a touch sensitive screen, selection with a pointer or mouse, handwriting recognition, voice recognition and so on. The PIN can also be communicated from another device via electrical or electromagnetic means.

Referring once again to FIG. 2, in another embodiment, a verifier identifier (V) 178 can also be provided as input to the combination function 130. The verifier identifier (V) 178 is a value associated with the identity of a particular verification computer or group of verification computers. The use of the verifier identifier (V) 178 allows the same user authentication device (with the same secret (K)) to be used with verifiers operated by different entities without giving a particular entity information that could be used to impersonate the user to another entity. Technology for implementing such systems is described in U.S. Pat. No. 6,985,583, titled "System and Method for Authentication Seed Distribution," by Brainard et al. the contents of which are hereby incorporated herein by reference.

For example, in one embodiment, the combination function 130 can combine a verifier identifier (V) 178, a secret (K) 170, a dynamic value (T) 172 and a generation value (N) 174 to generate an authentication code 93. The combination function can combine these values (K, T, N, V) in various ways and in any order. For example, the combination function can optionally first combine (K, T, N) to generate an authentication code 91 and then combine the authentication code 91 with a verifier identifier (V) to generate an authentication code 93 as a function of (K, T, N, V). Further, for example, in one embodiment, the combination function 130 can combine a PIN (P) 176, a verifier identifier (V) 178, a secret (K) 170, a dynamic value (T) 172 and a generation value (N) 174 to generate an authentication code 94.

In one embodiment, the stored secret (K) 170 can be a unit of information such as a numerical value that is uniquely associated with the user authentication device. The secret (K) 170 may be a value that is chosen from a large number of possible values such that it would be difficult for an opponent who had access to the output of the combination function 130 to guess the secret (K) 170 by trying each possible secret value to see if it resulted in the observed authentication code.

The secret (K) may be derived from a master secret ($K_{MASTER}$), as described in U.S. Pat. No. 6,985,583, entitled "System and Method for Authentication Seed Distribution," by Brainard et al. the contents of which are hereby incorporated herein by reference. In such a case, SV 370 serves as $K_{MASTER}$ and the secret (K) used to generate an authentication code evolves with a passage of time. The secret (K) may evolve each hour, each day, each month, or each year. This may be accomplished by representing secret (K) as a set of secrets: one corresponding to the current year ($K_Y$), one corresponding to the current month ($K_M$), one corresponding to the current day ($K_D$), one corresponding to the current hour ($K_H$), and one corresponding to the current minute ($K_{MIN}$), that is, $$K=(K_Y, K_M, K_D, K_H, K_{MIN})$$

Further details about the subject matter of FIG. 2 are described in U.S. patent application Ser. No. 12/976,575, titled "Updating Keys for Use in Authentication," the contents of which are incorporated herein by reference. Other technology for generating new seed values is described in U.S. Pat. No. 5,361,062, titled "Personal Security System," the contents of which are incorporated herein by reference. Further, methods that may be used in such a conventional system for performing time-based authentication are described in U.S. Pat. No. 7,363,494, titled "Method and Apparatus for Performing Enhanced Time-Based Authentication," the contents of which are incorporated herein by reference.

With reference to FIGS. 1-2, in at least one implementation of the technique described herein, combination function 130 as described above may be used without change within logic 380 and logic 360 except that a DV-based value may be derived from secret (K), and the DV-based value may be used in place of secret (K) by function 130. The DV-based value may be produced by XORing DV 320 (or a valued derived from DV 320) with secret (K).

Depending on the implementation, DV 320 may serve as a second master secret for generating a second set of secrets that may evolve each hour, each day, each month, or each year as described in U.S. Pat. No. 6,985,583 cited above.

Programming station 345 may be, include, or be included in a robotic and/or manual programming station that may be programmed via a programming interface, including but not limited to an electrical, RF, optical, or mechanical interface. The programming station 345 communicates with a token 310 and a central control station across respective communication links. Each of the communication links may be or include one or more of the following: a global computer network such as the Internet, a wide area network (WAN), a local area network (LAN), a satellite network, a telephone or cable network, a wireless link such as 802.11 and/or Bluetooth, a USB based link, a serial or parallel link, a processor interface link, a memory interface link, or various portions or combinations of these and other types of links. In at least some implementations, one or more of links may rely on a secure connection established therein, in a conventional manner, through the SSL protocol.

In at least one specific implementation, the link connecting the programming station 345 to the token 310 may be a relatively simple link such as a proprietary bus, or a chip interface such as IIC or SPI, and the link between the programming station and the central control station may be the Internet, a dialup link, or a physical media transfer such as a CD-ROM or tape.

Station 345 may be at and/or controlled by a configuration agent, and the central control station may be at and/or controlled by the customer. Alternatively, the station 345 may be controlled by the device vendor or other central control. As described above, the programming station 345 is responsible for helping to make the token 310 ready for use, in particular by helping to program SV 370 into the token 310, and for communicating with the central control station. The programming station 345 may include and be controlled by a computer system having a memory.

In the example implementation, token 310 includes a processor having an oscillator section driven by a crystal circuit that includes a crystal and capacitors. The processor has or is connected to memory (e.g., read only memory (ROM), electrically erasable programmable ROM (EEPROM), or FLASH) containing firmware instructions for the processor, and has or is connected to read-write memory (RAM). The processor is powered by a battery (in other implementations, power may be supplied in addition or instead by another power source such as a USB port). Depending on the implementation, token 310 may or may not have a counter driven by the oscillator section. The processor may use the oscillator section to help derive time/event data 395.

Keys 335, 340, logic 330, value 350, and logic 360 may rely for value authentication and signing on well-known public-key cryptography principles, according to which an entity (e.g., here, the vendor) has a public key (key 340) that can be published, and a private key (key 335) that is known only to the entity. Data encrypted by the public key can be decrypted only by the private key, and the public key can be used to verify digital signature created using the private key.

Although reference is made herein to random numbers, it is to be appreciated that the technique can be implemented using pseudorandom numbers or other types of strings of sufficient entropy.

The term device or computer as used herein refers generally to any processor-based equipment or system capable of implementing at least a portion of the technique as described herein.

Token 310 and station 345 may be, be included in, or include, by way of example and without limitation, a computer, a mobile telephone, a personal digital assistant (PDA), a smart card, an authentication token, a server, and/or various portions or combinations of these and other processing devices. Token 310 and station 345 may thus be implemented as otherwise conventional processing devices programmed by software and/or firmware to perform portions of the technique as described herein. Conventional aspects of such equipment are well known to those skilled in the art, and are therefore not described in detail herein.

In an example implementation, the token comprises or is otherwise associated with an authentication token, such as an RSA SecurID® authentication token. However, the technique is adaptable in a straightforward manner to a wide variety of other cryptographic processing devices.

Details regarding certain conventional cryptographic methodologies suitable for use in conjunction with the current technique may be found in, e.g., A. J. Menezes et al., Handbook of Applied Cryptography, CRC Press, 1997, which is incorporated by reference herein.

Figure 3:
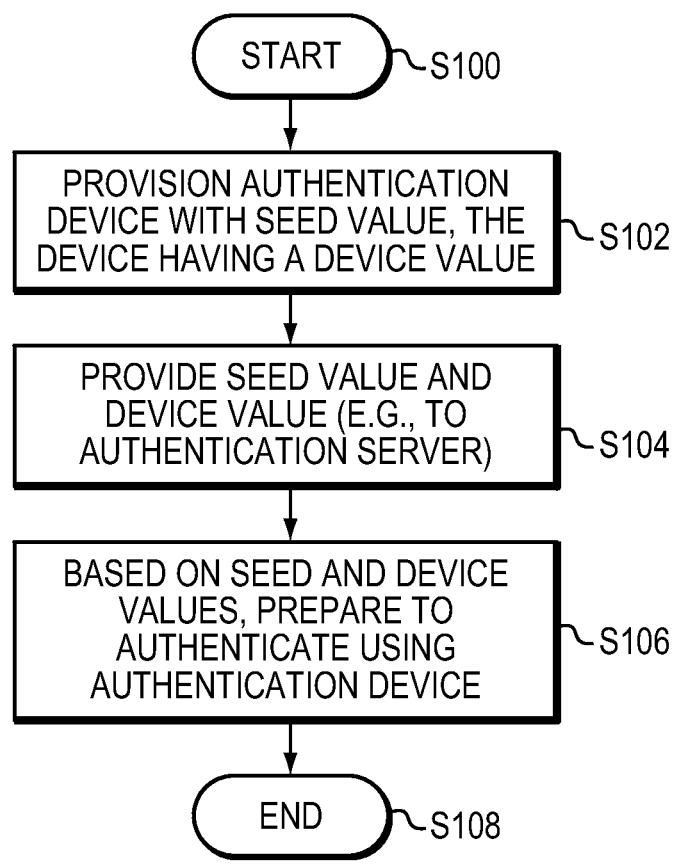
FIG. 3 is a flow diagram illustrating a process that may be used in connection with techniques described herein.

FIG. 3 is a flow diagram that illustrates an example method for use in managing seed provisioning. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

The flowchart illustrates a method that may allow customers to program a SV into an OTP hardware device having a device specific DV, while maintaining capabilities for the device vendor to issue a digitally signed token record for the authentication server and bind that token record to the specific OTP record. As shown, the method can start with a step S100. The method can be initiated manually by a user, for example, by entering a command in a command-line-interface or by clicking on a button or other object in a graphical user interface (GUI).

In step S102 the method may provision an authentication device with a SV where the authentication device has a DV. In an example embodiment, an authentication device vendor may program a unique DV into the authentication device before providing the authentication device to the customer. The customer may provide a unique SV—a SV the device vendor does not know—as an input to OTP logic. It should be noted that knowledge of the DV does not make it any easier to guess the SV or future OTP output.

In step S104, the method may provide the seed value and device value to, for example, a authentication server. The device value may be derived from a signed device value associated with the authentication device. For example, the device vendor may provide a digitally signed token record that includes the DV. The Authentication server verifies the signature of the signed token record and uses the device value contained in the signed token record for authentication.

After receiving the token record from the device vendor, the customer may program the unique SV into each OTP token. In alternative example embodiments, the SV may be appended to the signed token record separately (i.e., not as part of the signed token record), or may be provided to the server as a separate file with necessary information to be linked to the token record, or the signed token record and the SV may be combined to create a single digitally-signed record for the server.

In step S106, based on the seed value and the device value, the method may prepare to authenticate using the authentication device. For example, the customer may provide the signed token record and the SV to the authentication server to allow the server to verify the OPT output generated by the OTP token. The process ends at step S108.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art. Accordingly, the spirit and scope of the present invention should be limited only by the following claims.

What is claimed is:

1. A method for use in managing seed provisioning, the method comprising the steps of:
   programming a unique device value into an authentication device, the programming performed by a first user;
   creating, via the first user, a first user signed token record that includes the unique device value and configuration data;
   binding the token record to the authentication device;
   provisioning the authentication device with a unique seed value, the authentication device having the unique device value;
   programming the seed value into the authentication device, wherein the seed value is generated by the first user and programming the seed value into the authentication device is performed by a second user; and
   providing, via the second user, the unique seed value and the first user signed token record to an authentication server to authenticate using the authentication device.

2. The method of claim 1 further including deriving the device value using information associated with the authentication device.

3. The method of claim 2 wherein the information associated with the authentication device includes a signed device value associated with the authentication device.

4. The method of claim 2 wherein the information associated with the authentication device is contained in a signed token record.

5. The method of claim 4 wherein the signed token record is signed by an authentication device vendor.

6. The method of claim 4 further including verifying the signature of the signed token record.

7. The method of claim 4 further including authenticating the authentication device using the seed value and the device value in the signed token record.

8. The method of claim 1 wherein providing the seed value and device value further includes providing the seed value with a token record containing the device value to an authentication server.

9. The method of claim 1 wherein providing the seed value and device value further includes providing the seed value and device value to an authentication server.

10. The method of claim 9 wherein providing the seed value and device value to a server further includes providing to the server a concatenated or combined file comprising the seed value and a device value, signed device value, or signed token record.

11. An apparatus for use in managing seed provisioning, the system comprising:
   first hardware logic configured to program a unique device value into an authentication device, the programming performed by a first user;
   second hardware logic configured to create, via the first user, a first user signed token record that includes the unique device value and configuration data;
   third hardware logic configured to bind the token record to the authentication device;
   fourth hardware logic configured to provision the authentication device with a unique seed value, the authentication device having the unique device value;
   fifth hardware logic configured to program the seed value into the authentication device, wherein the seed value is generated by the first user and programming the seed value into the authentication device is performed by a second user; and
   sixth hardware logic configured to provide, via the second user, the unique seed value and the first use signed token record to an authentication server to authenticate using the authentication device.

12. The apparatus of claim 11 further including seventh hardware logic configured to derive the device value using information associated with the authentication device.

13. The apparatus of claim 12 wherein the information associated with the authentication device includes a signed device value associated with the authentication device.

14. The apparatus of claim 12 wherein the information associated with the authentication device is contained in a signed token record.

15. The apparatus of claim 14 wherein the signed token record is signed by an authentication device vendor.

16. The apparatus of claim 14 further including eight hardware logic configured to verify the signature of the signed token record.

17. The apparatus of claim 14 further including ninth hardware logic configured to authenticate the authentication device using the seed value and the device value in the signed token record.

18. The apparatus of claim 11 wherein providing the seed value and device value further includes providing the seed value with a token record containing the device value to an authentication server.

19. The apparatus of claim 11 wherein providing the seed value and device value further includes providing the seed value and device value to an authentication server.

20. The apparatus of claim 19 wherein providing the seed value and device value to a server further includes providing to the server a concatenated or combined file comprising the seed value and a device value, signed device value, or signed token record.

* * * * *